Jan. 3, 1933.  I. SHORT  1,893,042

REDUCTION GEARING

Filed May 29, 1931  2 Sheets-Sheet 1

WITNESSES.
R. A. Ridge
C. L. Soars.

INVENTOR
IRA SHORT.
BY A. B. Ravis
ATTORNEY

INVENTOR
IRA SHORT.
BY A. B. Reavis
ATTORNEY

Patented Jan. 3, 1933

1,893,042

UNITED STATES PATENT OFFICE

IRA SHORT, OF ESSINGTON, PENNSYLVANIA, ASSIGNOR TO WESTINGHOUSE ELECTRIC & MANUFACTURING COMPANY, A CORPORATION OF PENNSYLVANIA

REDUCTION GEARING

Application filed May 29, 1931. Serial No. 540,897.

My invention relates to reduction gearing and more particularly to that class of gearing used, for example, to transmit power to a ship propeller from a steam turbine, operating at a relatively high speed, and it has for an object to provide an improved lubricating system for the gearing.

In the class of service referred to, large quantities of lubricant must be furnished to the bearings and to the teeth of the gears. The lubricant is supplied under pressure to the bearings and to a series of jets located adjacent the meshing teeth upon which a copious supply of lubricant is sprayed. The lubricant thrown off by the gears, together with the drainage from the bearing, ordinarily drops to the bottom of the casing where a sump is formed. In many installations, lubricant drainage from other apparatus, for example, the prime mover driving the gearing, is conveyed to the gear casing whose sump functions as a general lubricant sump not only for the gear but other units associated with the gear. A pumping means is provided to withdraw the lubricant from the sump and convey it under pressure to the working parts of the gearing; and, in some cases, as mentioned before, to the bearings of other units associated with the gearing. A large amount of work is expended in conveying this lubricant to the top of the gearing and it is an object of my invention to lessen this amount by reducing the head at which the pump must operate.

In practicing my invention, I provide a reservoir disposed at an elevation higher than the sump, and adapted to catch a very substantial portion of the lubricant thrown off by the gears. I provide further means for conveying to the reservoir lubricant drainage from the gear bearings. Only that portion of lubricant which escapes the reservoir finds its way to the sump, where it is transferred to the reservoir by a relatively small pumping means. The main pump gathers the lubricant from the higher level reservoir and conveys it under pressure to the working parts of the gearing. It will be seen that the work expended in raising the lubricant is substantially reduced as the head at which the main pump must operate is reduced by the amount represented by difference in the oil level of the reservoir as compared to the sump.

It is, therefore, a prime object of my invention to provide this improved lubricant system by collecting a major portion of lubricant discharged by the gears at a high level.

It is a further object of my invention to accomplish this result without an objectional complicated structure but by one that will be simple to construct and which will be reliable in operation.

These and other objects are effected by my invention, as will be apparent from the following description and claims, taken in connection with the accompanying drawings forming a part of this application, in which:

Figure 1:
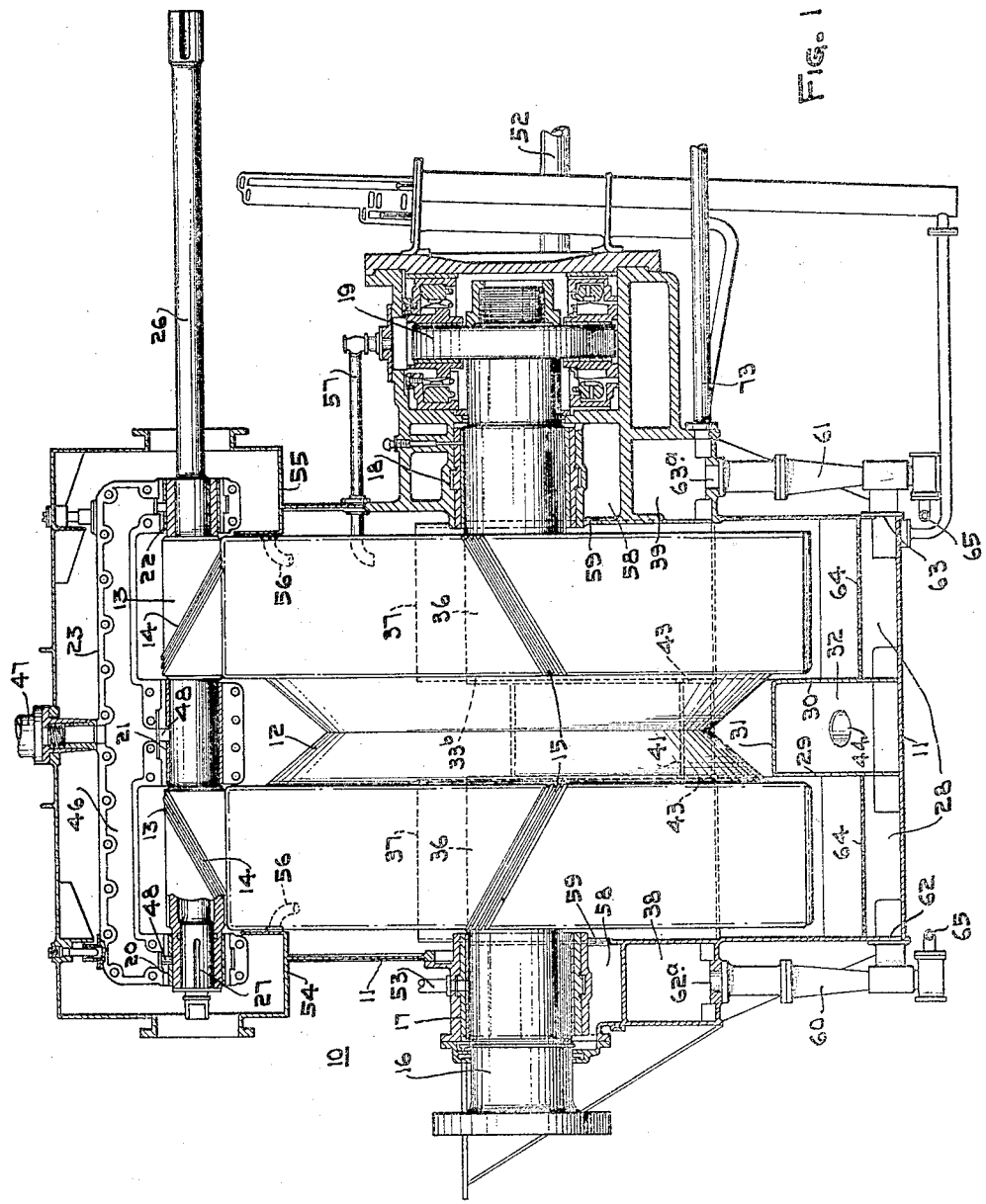
Fig. 1 is a sectional view of the gearing taken along the line I—I of Fig. 2.
Figure 2:
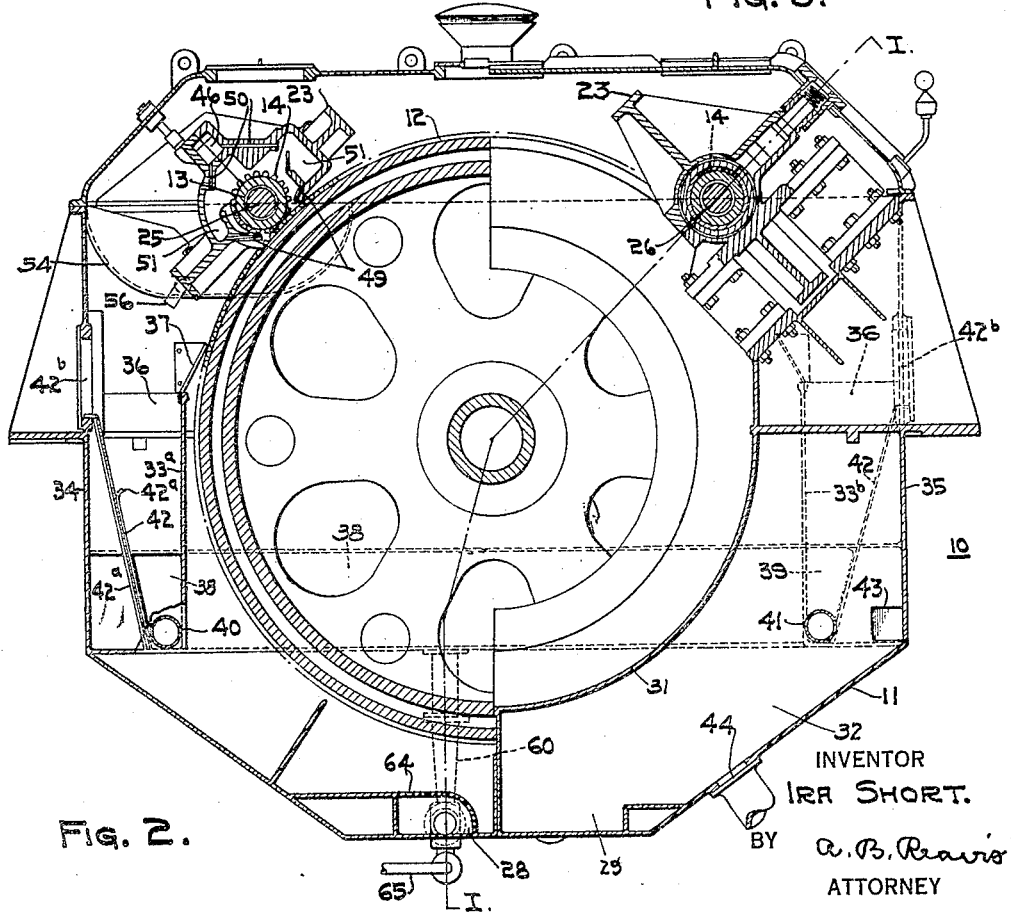
Fig. 2 is a transverse sectional view of the gearing, with parts broken away for clearness; and, Fig. 3 is a diagrammatic view showing piping connections when used with a prime mover.

Referring to Figs. 1 and 2, I show a reduction gear indicated generally by reference 10 comprising a casing 11 enclosing a gear 12 meshing with pinions 13, 13. The gear 12 has axially spaced toothed portions 15, meshing with the toothed portions 14 of the pinions 13. The gear 12 is carried by a driven shaft 16 journalled in bearings 17 and 18. Axial movement of the shaft is prevented by a thrust bearing 19. The bearings 17 and 18 together with the thrust bearing 19 are supported by the casing 11.

The pinions 13, are journalled in bearings 20, 21 and 22 carried by floating frames 23, which are supported by the casing 11. Rotation of the pinions 13 is effected by driving members 25 and 26 keyed to the pinions at 27. The pinions 13 are disposed symmetrically with respect to each other above the horizontal center of the gear 12 and on each side of the vertical center thereof and mesh with the upper half of the gear 12.

A sump 28 is formed in the bottom of the casing below the gear portions 15 and is shown as divided by walls 29 and 30 which with the bottom of the gear casing 11 and the U-shaped wall 31 define a chamber 32.

Reservoirs 33a are mounted in the casing 11 between the gear toothed portions 15 and the casing side wall 34 and reservoirs 33b between said gear portion 15 and side wall 35.

The reservoirs 33a and 33b have open upper portions 36 provided with baffles 37 which are inclined toward the gear portions 15 and terminate adjacent thereto. Transverse ducts 38 and 39 (Fig. 1) form communication between reservoirs 33a and 33b disposed on opposite sides of the casing 11 and conduits 40 connect reservoirs 33a disposed side by side. Conduits 41 connect reservoirs 33b in a similar manner. Screens 42 are removably mounted in lateral guides 42a and are located between the open upper portions 36 and the openings 43 located adjacent the bottom of the reservoirs 33a and 33b. Openings 42b providing access to the screens 42 and permitting their withdrawal from the guides 42a are located in side walls 34 and 35 in alignment with the guides 42a. The reservoir openings 43 provide communication between the reservoirs 33a and 33b and the chamber 32 which has an outlet 44 connected to the main circulating ejector 45.

Lubricant for the meshing pinion and teeth gear and the pinion bearings 20, 21 and 22 is conveyed to passage 46 formed in each floating frame 23 by a conduit 47. Ports 48 connect the bearings 20, 21 and 22 with the passage 46 and the spraying jets 49 are supplied through the holes 50 in communication with the passage 46. Lubricant is discharged by the holes 50 to receptacles 51 formed in the floating frames 23 and then flows from the receptacle by gravity through jets 49 to the meshing teeth of the gear 15. Lubricant is supplied to the thrust bearing 19 and journal bearing 18 by conduit 52 and to bearing 17 by conduit 53.

Disposed beneath pinion bearings 20 and 22 are pans 54 and 55 into which drainage from the bearings 20 and 22 flows and it is then conveyed by openings or conduits 56 to the reservoirs 33a and 33b, the discharge ends of the conduits 56 being aligned with and above the open upper portions 36 of reservoirs 33a and 33b. A substantial portion of the lubricant thrown off by the gear when operating in counter-clockwise direction, Fig. 1, is deposited in the reservoirs 33a, the baffle 37 assisting in this operation. When the gear is operated in a clockwise direction, the reservoirs 33b function to collect the lubricant thrown by the gear.

The lubricant discharge from the thrust bearing 19 is conveyed by a conduit 57 the end of which is so disposed as to pour the contents in the reservoir 33b in the same manner as the conduits 56 associated with the pans 54.

The lubricant draining from the inner ends of journal bearings 17 and 18 drops to the sump 28 and from the outer ends, the flow is to chambers 58 formed in the casing 11 continuing to the sump 28 through openings 59 in casing end walls.

Transfer of lubricant, collected by the sump, to the reservoirs is effected by auxiliary transfer ejectors 60 and 61 which have their inlets connected to the sump 28 at 62 and 63, strainers 64 being interposed between the ejector inlets 62 and 63 and the sump 28. The ejectors 60 and 61 discharge into the transverse reservoir connecting ducts 38 and 39 as shown at 62a and 63a. Motivating fluid is conveyed to ejectors 60 and 61 and to the main circulating ejector 45 by means of conduit 65, Fig. 3.

Figure 3:
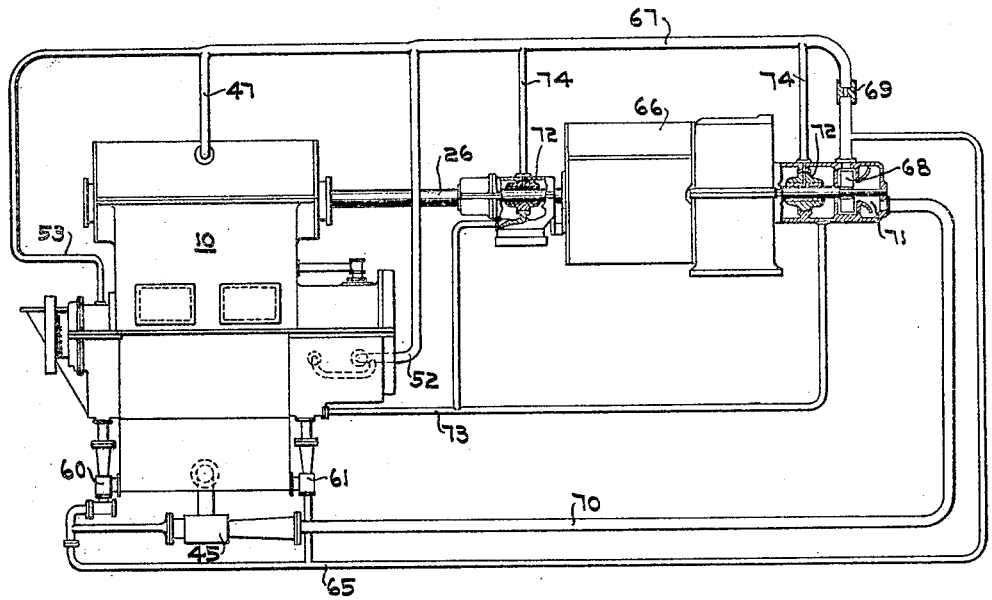

In Fig. 3, the reduction gearing 10 is shown driven by a steam turbine 66. The conduits 47, 52 and 53 are connected to a supply conduit 67 which conveys lubricant under pressure from a pressure source, such as an impeller type pump 68 mounted on the driving shaft 26. An orifice 69 is placed in conduit 67 for limiting the flow of lubricant from the impeller so that the impeller discharge pressure may be used for governing purposes, as is well known in the art. The turbine bearings 72 receive lubricant through branch conduits 74 connected to the supply conduit 67. The conduit 65 for conveying motivating fluid to the ejectors 60, 61 and 45 is connected to the discharge side of the impeller 68. Lubricant discharged by the turbine bearings 72 is drained through conduit 73 to the high level reservoirs 33a and 33b. The main ejector draws lubricant from the high level reservoirs 33a and 33b in the gear casing 11 and propels it through conduit 70 to the suction chamber 71 of the impeller 68.

From the foregoing, it will be apparent that the purpose of the present invention is to reduce the work of pumping in a circulatory lubricating system. This is achieved by having the collection chambers of the system located at a relatively higher elevation than is customary, the elevated reservoirs 33a and 33b being located above the sump. The major portion of the circulating lubricant goes directly to the elevated reservoirs, and the residue of lubricant dripping from the gear, as well as drainage from the main bearings, going to the sump is pumped from the latter by the transfer ejectors 60 and 61 to the elevated reservoirs. While the ejector 45 is shown as located below the gear casing, it will be apparent that the elevated reservoirs and the U-shaped chamber 32 merely constiute means for providing a static head at the inlet of the ejector so that the effect is the same as if the ejector was connected directly to the elevated reservoirs 33a and 33b at a relatively higher level. Therefore, the present lubricating system takes care of all lubricating requirements and escaping or surplus lubricant is collected and supplied to the circulating pump in such a way that the work of the latter is materially reduced. The transfer ejectors 60 and 61 merely function to drain lubricant from the sump and to supply it to the elevated reservoirs, that is, to the main circulating system.

The U-shaped chamber 32, together with the elevated collection chambers or reservoirs 33a and 33b, constitute a common storage space or reservoir for supplying lubricant to the inlet of the ejector 45. By having the chamber 32 U-shaped and sufficiently narrow, it may be arranged in the space between adjacent gear rims, as shown in Fig. 1. Also the structure and arrangement of the U-shaped chamber 32 and the elevated collection chambers or reservoirs 33a and 33b is such that the level of lubricant may be maintained without having the lower sides of the gears run in oil, the gearing being adequately lubricated by apparatus associated with the pinions, as already described. The common storage space is, therefore, available for the collection and maintenance of lubricant at a relatively high level, and the gravity head assisting the ejector 45 is dependent upon the elevation of the liquid level above the ejector inlet. Therefore, any lubricant added to the column above the ejector inlet has the advantage of being pumped with the assistance of gravity head. The ejector 45, of course, must elevate lubricant from its level to the level of the discharge point, and this pumping head is reduced to the extent of the assisting gravity head. The greater the gravity head, the more the pumping capacity of the ejector 45, an increase in gravity head being equivalent to a reduction in discharge head. The ejector 45 is so designed and its supply of motive fluid is so controlled that a normal elevated level of lubricant is maintained, and the apparatus tends to maintain an equilibrium condition such that the level of lubricant is substantially constant, for a lowering of level reduces the gravity head and pumping capacity and an increase in level has the contrary effect, with the result that, in normal operation, the apparatus tends to maintain a substantially constant level. The work of pumping lubricant is, therefore, reduced to the extent of the assistance of gravity head of lubricant added to the column above the inlet side of the ejector 45. In other words, the present invention is a lubricating system wherein the work of pumping is reduced by taking advantage of gravity, the present arrangement, due to static head provided, being equivalent to connecting the ejector 45 to the elevated reservoirs 33a and 33b at the level thereof. Since a circulatory system is provided having elevated collection reservoirs, which are advantageous to the extent of their elevation so far as pumping is concerned, it is necessary to elevate such lubricant as enters the sump 28 thereinto and the transfer ejectors 60 and 61 serve this purpose.

From the foregoing, it will be seen that the work of circulating lubricant in my improved system is reduced by having the reservoirs 33a and 33b elevated with respect to the sump, that is, the suction load of the ejector 45 is reduced over an arrangement where all the lubricant goes to the sump, to the extent of the quantity of oil caught or draining into the upper reservoirs; and, as the major portion of lubricant circulating in the system is caught in the elevated reservoirs 33a and 33b, the major portion of the lubricant is circulated in the most efficient manner. The lubricant which gravitates into the sump is raised to the level of the reservoirs 33a and 33b by the auxiliary or transfer ejectors 60 and 61. Hence, the principal advantage of my improvement is the reduction in head for the main ejectors 45 afforded by the elevated reservoirs 33a and 33b.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. The combination with a pair of meshing gears enclosed by a casing, of a lubricating system for the gears including means for supplying lubricant to the gears, a sump arranged below the gears for collecting lubricant, circulating means for supplying lubricant to said supply means and including a reservoir in said casing and adapted to catch lubricant thrown off by the gears, and means for conveying lubricant from the sump to the circulating means, said reservoir being arranged above the sump in order to reduce the work of said circulating means in circulating lubricant.

2. The combination with a pair of meshing gears enclosed by a casing, of a lubricating system for said gears including means for supplying lubricant to the gears, a lubricant sump arranged in said casing below the gears, circulating means for supplying lubricant to said supply means including a reservoir, means for directing into said reservoir lubricant discharged by said gears, and means for conveying lubricant from the sump to the circulating means, said reservoir being arranged at a higher elevation than the sump in order to reduce the work of said circulating means in circulating lubricant.

3. The combination with a pair of meshing gears enclosed by a casing, of a lubricating system for said gears including means for supplying lubricant to the gears, a sump for collecting lubricant disposed in said casing below the gears, circulating means for supplying lubricant to said supply means, including a reservoir adapted to catch lubricant thrown off by the gears and arranged between the sides of the gear and the sides of casing, and means for conveying lubricant from the sump to the circulating means, said reservoir being arranged at a higher elevation than the sump in order to reduce the work of said circulating means in circulating lubricant.

4. The combination with a pair of meshing gears enclosed by a casing, of a lubricating system for said gears including means for supplying lubricant to the gears, a sump for collecting a portion of lubricant discharged by said gears and disposed below the same, circulating means for supplying lubricant to said supply means including a reservoir between a side of one of the gears and a casing side wall, said reservoir having an opening and a deflector for directing into the opening of the reservoir a substantial portion of lubricant thrown off by the gears, and means for conveying lubricant from said sump to said circulating means.

5. The combination with a pair of meshing gears supported by bearings and a casing for enclosing the gears, of a lubricating system including means for supplying lubricant to said gears and to the bearings, circulating means for supplying lubricant to said supply means and including a reservoir disposed in said casing and adapted to receive a substantial portion of lubricant discharged by said gears and bearings, a sump formed in the casing below the gears for receiving the remaining portion of lubricant discharged by the gears and bearings, and means for conveying to said circulating means lubricant collected in said sump, said reservoir being arranged at a higher elevation than the sump in order to reduce the work of the circulating means in circulating lubricant.

6. The combination with a pair of meshing gears supported by bearings and a casing for enclosing said gears, of a lubricating system including means for supplying lubricant to said gears and bearings, a lubricant sump formed in said casing at the bottom thereof, circulating means for supplying lubricant to said supply means including a reservoir disposed in the casing and adapted to receive a portion of lubricant thrown off by said gears, means for conveying to said circulating means lubricant drainage from the bearings, and means for conveying lubricant in the sump to said circulating system, said reservoir being arranged at a higher elevation than the sump in order to reduce the work of the circulating means in circulating lubricant.

7. The combination with a reduction gear including a pinion, a driving member for said pinion, bearings for supporting said driving member, a gear meshing with said pinion, a shaft for said gear supported by bearings and a casing for enclosing said gears, of a lubricating system including means for supplying lubricant to said gears and bearings, a sump in said casing for collecting a portion of lubricant discharged by said gears and bearings, circulating means for supplying lubricant to said supply means including a reservoir disposed in the casing and adapted to receive a substantial portion of the lubricant thrown off by said gears, means for conveying to said reservoir lubricant drainage from some of the bearings, and means for conveying lubricant from said sump to said circulating means, said reservoir being arranged at a higher elevation than the sump in order to reduce the work of said circulating means in circulating lubricant.

8. The combination with a driven gear, a shaft for said gear, bearings for supporting said shaft, a thrust bearing for said shaft, pinions meshing with the upper half of said gear, driving members for said pinions, bearings for supporting said driving members and a casing for enclosing said gears, of a lubricating system, including means for supplying lubricant to said bearings and to the teeth of said gear, a sump formed in said casing below the gear, circulating means for supplying lubricant to said supply means and including reservoirs, disposed in said casing at an elevation higher than said sump and having open upper portions provided with deflectors inclined toward and terminating adjacent to the teeth of a gear and adapted to direct into said reservoirs a substantial portion of lubricant thrown off by said gears, means for draining to said reservoirs lubricant discharged by some of the bearings, and means for conveying lubricant from said sump to said reservoirs.

9. The combination with a pair of meshing gears including a driven gear enclosed by a casing, of a lubricating system for the gears including means for supplying lubricant to said gears, a lubricant sump disposed in the casing below the gears, circulating means for supplying lubricant to said supply means including reservoirs arranged in said casing on each side of said driven gear and between the toothed face of the gear and the side walls of the casing, said reservoirs having open portions provided with deflectors for directing into said reservoirs a substantial portion of lubricant thrown off by the gear, conduits connecting said reservoirs and providing for flow of lubricant from one reservoir to the other, strainers disposed in said reservoirs between the bottoms thereof and said open portions, and means for conveying lubricant from said sump to said circulating means.

In testimony whereof, I have hereunto subscribed my name this 28th day of May, 1931.

IRA SHORT.